INVENTORS
JAMES E. ADAMS
WERNER E. L. HAAS

BY

*J. D. Maccarone*

ATTORNEY 3,669,525
LIQUID CRYSTAL COLOR FILTER
James E. Adams, Ontario, and Werner E. L. Haas, Webster, N.Y., assignors to Xerox Corporation, Stamford, Conn.
Filed Jan. 6, 1971, Ser. No. 104,367
Int. Cl. G02f 1/24
U.S. Cl. 350—158
15 Claims

ABSTRACT OF THE DISCLOSURE

An optical filter system capable of transmitting a single wavelength band or a plurality of wavelength bands of incident radiation while simultaneously rejecting substantially all other wavelengths of incident radiation is described. The optical filter system utilizes liquid crystal films having optical negative properties.

BACKGROUND OF THE INVENTION

This invention relates to an optical filter system and more specifically to an optical filter system employing liquid crystalline substances.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well known in the liquid crystal art.

Liquid crystals have been found to be sensitive or responsive to temperature, pressure, shear, foreign chemical compounds and to electric and magnetic fields, as disclosed in copending application Ser. No. 646,532 filed June 16, 1967, Ser. No. 646,533 filed June 16, 1967, Fergason et al. Patent 3,114,838, French Patent 1,484,584 and Fergason Patent 3,409,404. Liquid crystals have also been found to be useful in imaging systems such as are described in copending application Ser. No. 821,565 filed May 5, 1969 and Ser. No. 867,593 filed Oct. 20, 1969.

Optical filters are well known and widely used devices for passing radiation of selected wavelengths and simultaneously rejecting undesirable wavelengths. One of the common types of optical filters is the band pass filter. A well known type of band pass filter is the so-called interference filter which, generally speaking, comprises alternating layers of a dielectric material having a relatively high index of refraction and a dielectric material having a relatively low index of refraction. By making the layers of the proper thickness, the reflections of certain bands of wavelengths from the boundaries between the materials are reinforced and thereby removed from the transmitted beam. The other wavelengths which are grouped together in a plurality of orders of widely spaced bands pass through the material. These prior art interference filters have tended to be relatively expensive devices because of the problems inherent in their manufacture.

In growing areas of technology, such as liquid crystals, new methods, apparatus, compositions and articles of manufacture are often discovered for the application of the new technology in a new mode. The present invention relates to a novel and advantageous optical filter system utilizing liquid crystalline substances.

SUMMARY OF THE INVENTION

It is therefore an object of the invention to provide a novel optical filter system.

It is still another object of the invention to provide an optical filter system which utilizes liquid crystal films having optically negative properties.

It is still another object of the invention to provide an optical filter system which will permit transmission of one or more selected wavelength bands of incident radiation while rejecting substantially all other wavelengths within the incident radiation.

It is a further object of the invention to provide an optical filter system which is suitable for use in the ultraviolet, visible and infra-red regions of the electromagnetic spectrum.

A still further object is to provide an optical filter which may be used as part of a display service.

Yet still another object is to provide an optical filter which may be used to provide selected wavelengths of light for use in color xerographic reproduction methods.

Still another object of the invention is to provide optical filters which are relatively inexpensive and can be made in relatively large sizes.

The foregoing and other objects and advantages are realized in accordance with the present invention, broadly speaking, by arranging at least one film of a liquid crystalline substance having optically negative properties between a linear polarizer and a linear analyzer with the latter two elements having a predetermined relationship between their axes of polarization such that the cooperative action of the two elements is effective to prevent the transmission of incident plane polarized or unpolarized light through the linear analyzer.

Birefringence, also referred to as double refraction is an optical phenomenon characteristic of some solid crystals and most liquid crystal substances. When a beam of unpolarized light strikes a birefringent substance it is split into two polarized components whose transverse vibrations are at right angles to each other. The two components are refracted at different angles through the substance and emerge as beams of polarized light. By the term "liquid crystalline substance which has optically negative properties" as used herein is meant one for which the extraordinary index of refraction $n_E$ is smaller than the ordinary index of refraction $n_0$. For a detailed description of this phenomenon see Optical Crystallography, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of this configuration of the molecules the direction of the long axes of the molecules in each layer is displaced slightly from the corresponding direction in adjacent layers. This displacement is cumulative over successive layers so that the overall displacement traces out a helical path. A comprehensive description of the structure of cholesteric liquid crystals can be found in Gray, G. W., Molecular Structure and the Properties of Liquid Crystals, Academic Press, 1962.

Cholesteric liquid crystals have been found to have the property that when the propagation direction of plane polarized or unpolarized light is along the helical axis thereof, i.e., when the light enters in a direction perpendicular to the long axes of the molecules, white light is essentially unaffected in transmission through thin films of such liquid crystals except for a wavelength band centered about some wavelength $\lambda_0$ where $\lambda_0 = 2np$ with $n$ representing the index of refraction of the liquid crystal substance and $p$ the pitch or repetition distance of the helical structure. The bandwidth $\Delta\lambda$ of the wavelength band centered about $\lambda_0$ will typically be of the order of about $\lambda_0/14$. For light of a wavelength $\lambda_0$, the cholesteric liquid crystal, under these conditions, exhibits selective reflection of the incident light such that approximately 50% of the light is reflected and approximately 50% is transmitted (assuming negligible absorption which is usually the case) with both the reflected and transmitted beams being approximately circularly polarized. For light having wavelength around $\lambda_0$ but not at $\lambda_0$ the same effect is present but not completely. The transmitted light is not circularly polarized but instead is elliptically polarized. The cholesteric liquid crystals which exhibit this property of selective reflection of light in a region centered about some wavelength $\lambda_0$ are said to be in the Grandjean or "disturbed" texture. If $\lambda_0$ is in the visible spectrum the liquid crystalline film appears to have the color corresponding to $\lambda_0$ and if $\lambda_0$ is outside.

Furthermore, depending upon the intrinsic rotatory sense of the helical nature of the material, i.e., whether it is right-handed or left-handed, the light that is transmitted at either right-hand circularly polarized light (RHCPL) or left-hand circularly polarized light (LHCPL). The transmitted light is circularly polarized with the same sense of polarization as that intrinsic to the helical nature of the material. Thus a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in accordance with popular convention, by the kind of light which is reflected at $\lambda_0$. When a film is said to be right-handed it is meant that it reflects RHCPL and when a film is said to be left-handed it is meant that it reflects LHCPL.

Thus, a right-handed cholesteric liquid crystal substance transmits LHCPL essentially completely at $\lambda_0$ whereas the same substance reflects almost completely RHCPL. Conversely a left-handed film is almost transparent to RHCPL at $\lambda_0$ and reflects LHCPL. Since plane polarized or unpolarized light contain equal amounts of RHCPL and LHCPL, a cholesteric liquid crystal film is approximately 50% transmitting at $\lambda_0$ for these sources when the liquid crystal is in its Grandjean texture.

Thus when a liquid crystal film possessing optically negative properties is placed between a linear polarizer and a linear analyzer whose axis of transmission is about 90° to that of the polarizer in a manner such that the helical axis defined by the molecules which make up the layers of the liquid crystal substance is parallel to the direction of the light propagation and white light is directed upon the device at normal incidence, the emergent beam transmitted by the device is comprised of a spectral band centered around a wavelength $\lambda_0$. The remainder of the light is substantially completely extinguished by the optical filter.

An important feature of the invention is that any number of liquid crystal films, each having a different $\lambda_0$, may be stacked in series between the polarizer and the linear analyzer and the emergent beam will contain a wavelength band corresponding to each liquid crystal film. Therefore it can be seen that, according to the invention, optical filters may be constructed to conveniently provide a beam of light having any desired number of wavelength bands. The novel optical filter system functions independently of the intrinsic screw sense of the liquid crystal substances, i.e., similar results are obtained whether the substances are right-handed or left-handed in sense.

The optical filter system of the invention is applicable for use in any situation where a broad band source such as any projection source is present and it is desired to extinguish all except one or more wavelength bands from the light emitted by the source. More specifically it can be employed in instrumentation such as blood analyzers, monochromators and the like.

The number of liquid crystal films present in any particular optical filter constructed according to the invention is dependent only upon the particular end use in which the filter is to be utilized. For example, a filter having three liquid crystal films with different $\lambda_0$ values falling within the visible spectrum could be employed with a source of white light thus narrowing the output to three discrete colors which could be selected to span the visible spectrum. Three bands of differently colored light would be suitable for use in a color display.

These optical filters are further useful in the reproduction of color images by color xerography with any technique by which the color reproductions are made. In the well known polychromatic photoelectrophoretic imaging method wherein electrically photosensitive pigment particles are dispersed in an insulating carrier liquid, the individual pigment particles are typically selected to respond to red, green and blue light and migrate through the carrier liquid when contacted with light radiation of the appropriate wavelength. A detailed discussion of photoelectrophoretic imaging is found in U.S. Pat. 3,384,566. Thus an optical filter could be constructed to provide the necessary wavelengths of radiation for such a color imaging system in conjunction with a white light source. An important advantage of these optical filters is that they may be made relatively inexpensively and can be supplied in relatively large sizes. Furthermore they can be adapted to function in the ultra-violet, visible and infra-red regions of the electromagnetic spectrum.

The invention will now be described in detail with respect to preferred embodiments thereof to enable those skilled in the art to more fully understand the same, especially when read in conjunction with the accompanying drawings in which.

Figure 1:
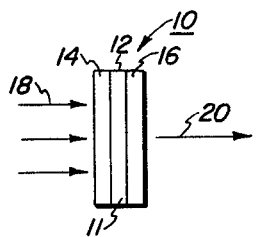
FIGS. 1 and 2 are schematic side cross-sectional views of typical optical filters constructed according to the invention.

Referring now to FIG. 1 there is seen an optical filter, generally designated 10, comprising a liquid crystalline film 11 enclosed in optional protective outer casing 12 and arranged between a linear momber 14 and a linear analyzer 16.

Any suitable cholesteric liquid crystalline material, mixture or composition comprising cholesteric liquid crystals or composition having cholesteric liquid crystalline characteristics may be utilized for liquid crystal film 11. Typical suitable cholesteric liquid crystal substance include derivatives from reactions of cholesterol and inorganic acids, such as, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-2-(2-methoxyethoxy) ethyl carbonate; cholesteryl geranyl carbonate; cholesteryl heptyl carbamate; and alkyl amides and aliphatic secondary amines derived from 3β-amino-α-5-cholestene and mixtures thereof; peptides such as poly-γ-benzyl-α-glutamate; derivatives of beta sitosterol such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal films of the optical filter system; and it has been found that such compositions may contain up to 98% by weight of the nematic component yet continue to function in accordance with the invention. Nematic liquid crystalline materials suitable for use in combination with cholesteric liquid crystalline materials in the advantageous system of the present invention include: p-azoxyanisole, p-ozoxyanisole, p-azoxyphenetole, p-butoxybenzoic acid, p-methoxy-cinnaminic acid, butyl-p-anisylidene-p'-aminocinnamate, anisylidene para-aminophenylacetate, p-ethoxy-benzylamino-a-methyl-cinnamic acid 1,4-bis (p-ethoxy benzylidene) cycle hexanone, 4,4'-dihexyloxybenzene, 4,4'-diheptyloxybenzene, anisal-p-amino-azo-benzene, anisaldazine, a benzeneazo- (anisal-naphthylamine), anisylidene-p-n-butylaniline, n,n'-non-oxybenzeltoluidine, mixtures of the above and many others.

Compositions suitable for use as liquid crystal films of the novel optical filter system may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystal substances include n-propyl-4'-ethoxy biphenyl-4-carboxylate; 5-chloro-6-n-heptyl-oxy-2-naphthoic acid; lower temperature meophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids ethyl-p-azoxy-cinnamate; ethyl-p-4-ethoxybenzylidene-aminocinnamate; ethyl-p-azoxybenzoate; potassium oleate; ammonium oleate; p-n-octyloxy-benzoic acid; the low temperature mesophase of 2-p-n-alkoxy-benzylideneamino-fluorenones with chain length of 7 or greater; the low temperature mesophase of p-(n-heptyl)oxybenzoic acid; anhydrous sodium stearate; thallium (I) stearate; mixtures thereof and others.

Mixtures of liquid crystals can be prepared in organic solvents such as chloroform, petroleum, ether and others, which are typically evaporated from the mixture leaving the liquid crystal composition. Alternatively, the individual components of the liquid crystalline mixture can be combined directly by heating the mixed components above the isotropic transition temperatures.

The above lists of suitable liquid crystalline imaging materials are intended to encompass mixtures of any of the above. The list is representative of suitable materials, and is in no way intended to be exhaustive or limiting. Although any liquid crystalline composition have cholesteric liquid crystalline characteristics is suitable for use in the present invention, it should be recognized that various different cholesteric liquid crystal substances or mixtures thereof or combinations of cholesteric liquid crystal substances with other substances such as nematic liquid crystals will typically possess the desired properties which make them suitable for use according to the invention in some specific temperature range which may be at room temperature or substantially above or below room temperature. However, all of the various substances, mixtures or combinations thereof will function according to the method of the invention at some temperature. Typically the optical filters of the invention will be used at or near room temperature. Thus, it is preferred employ liquid crystalline substances which have a liquid crystal state at or near room temperature. Generally speaking, the liquid crystal substance will preferably have a liquid crystal state at the desired operational temperature.

The liquid crystal films employed in the optical filter system of the invention will typically have a thickness of from about 0.5 to about 20 microns. The liquid crystal film 11 is typically tacky, soft, viscous, glassy or liquid and thus is preferably encased in a protective outer casing 12 to protect the film from foreign matter such as dust, insects or the like. The purpose of protective outer casing 12 is to keep the liquid crystal film 11 in place and free of any contamination. Thus the protective casing may be any suitable material, flexible or rigid, which is optically isotropic and transparent to the incident light radiation and which is non-reactive with the liquid crystalline film. Typical suitable materials for this purpose include glass, fused silica and any other materials having the required characteristics. It is further preferred to utilize materials which have an index of refraction about the same as that of the liquid crystal film to minimize loss of light.

It should be recognized that where it is so desired, the linear polarizer and the linear analyzer may themselves function as the protective members for the liquid crystal film. Thus, for example, the liquid crystalline substance can be first coated on either the linear polarizer or linear analyzer and the other member then placed against the free surface of the liquid crystal film. Generally speaking, where the device itself is encased in a protective material, the latter may be any suitable material which is optically transparent. However it will be apparent to those skilled in the art that when any protective material is located within the linear polarizer-liquid crystal film-linear analyzer combination it must be optically isotropic as well as optically transparent.

Linear polarizer 14 and linear analyzer 16 may be selected from any of many various materials. Typical suitable materials are commercially available from Polaroid Corp. under the trade name Polaroid Sheet. The linear polarizer and linear analyzer may be rotated in tandem without any change in the emergent beam.

For optimum results the linear polarizer and the linear analyzer are arranged with a pre-determined angular relationship between their axes of polarization of about 90° since, at this condition, the cooperative action of the two members is effective to prevent the transmission of incident unpolarized light through the linear analyzer. However it should be recognized that this angular relationship may be varied over a relatively large range, for example, from about 80° to about 100° without substantially affecting the results obtained from the use of the optical filter system of the invention. Moreover, the system can function effectively when this angular relationship is outside of the above described range but with a corresponding deterioration in the results obtained.

Figure 3:
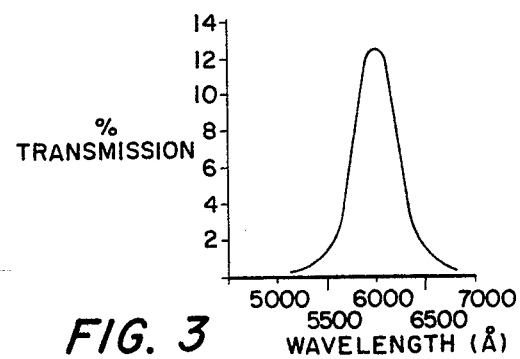
FIGS. 3 and 4 are graphical illustrations showing the intensity of the emergent beam over the spectrum of incident light for typical optical filters of the invention.

For optimum results, the optical filter 10 is preferably arranged in the path of the light beam in a manner such that the incident radiation, represented by arrows 18, reaches the filter at normal incidence with liquid crystal film 11 being preferably disposed so that the helical axis of the liquid crystal substance is in the direction of the light propagation. Should the incident radiation not be at normal incidence to the filter device so that the helical axis of the liquid crystal substance is not exactly along the direction of the light propagation, the optical filter will function according to the invention however with some deterioration in the bandwidth of the emergent beam. The characteristics of the emergent beam, represented by arrow 20 are shown in FIG. 3. In this exemplary instance the liquid crystal film is comprised of a composition of 20% cholesteryl chloride by weight in cholesteryl nonanoate having a $\lambda_0$ value of about 6000 A. Thus, the optical filter conveniently substantially completely extinguishes all the wavelengths of light radiation in the incident light beam except those within the region centered around about 6000 A.

Figure 2:
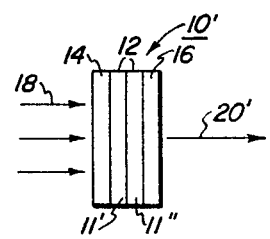
Figure 4:
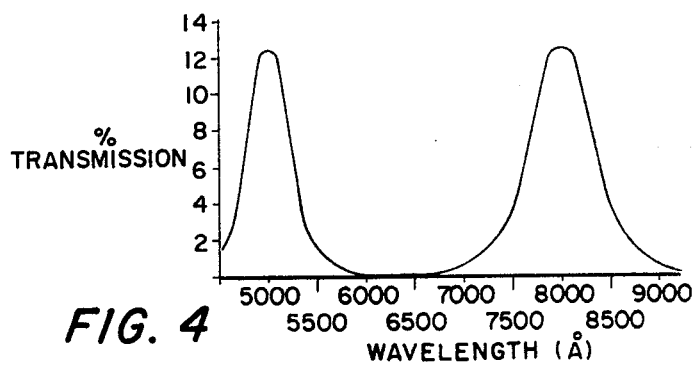

FIG. 2 illustrates another embodiment of the optical filter system of the invention. The optical filter 10' is constructed in the same manner as described previously with the exception that it has two liquid crystal films 11' and 11'' placed in series between the linear polarizer 14 and the linear analyzer 16. Liquid crystal films 11' and 11'' are compositions of 90% cholesteryl chloride by weight in cholesteryl oleyl carbonate and 40% cholesteryl chloride by weight in cholesteryl nonanoate respectively and have respective $\lambda_0$ values of about 5000 A. and about 8000 A. The characteristics of the emergent beam 20' obtained from optical filter 10' are illustrated in FIG. 4.

Of course, the embodiments shown in FIGS. 1 and 2 are meant to be illustrative only since, as previously discussed, any number of liquid crystal films may be inserted in series between the polarizer and the linear analyzer. Further, although the $\lambda_0$ values of the liquid crystal films illustrated have been shown to be in the visible spectrum, the $\lambda_0$ values of any individual liquid crystal films in an optical filter made according to the invention may be in any region of the light spectrum. Liquid crystal substances are known or compositions thereof can be prepared which have $\lambda_0$ values of from about 2700 A. to about 10 microns.

Figure 5:
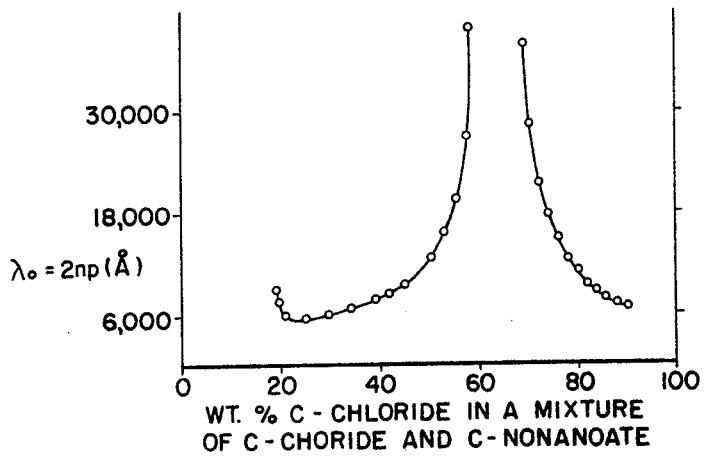
FIG. 5 is a graphical illustration showing $\lambda_0$ versus composition for compositions containing various amounts of the cholesteric liquid crystal substances having opposite intrinsic screw sense.

FIG. 5 graphically illustrates the $\lambda_0$ values which can be obtained from the mixture of two cholesteric liquid crystal substances. It has been found that the pitch of two component mixtures of certain cholesteric liquid crystals is a strong function of chemical composition. Over a wide range of materials, the pitch of a mixture can be accurately represented by a weighted average of the ingredients. Further if components with opposite intrinsic screw sense, i.e., right-handed and left-handed, are mixed there will exist one composition corresponding to no net rotation or infinite pitch. A detailed discussion of this phenomenon is found in Liquid Crystals and Ordered Fluids, J. E. Adams, W. Haas and J. J. Wysocki, page 463, Plenum Press, 1970.

In this exemplary case the compositions are made from cholesteryl nonanoate, a left-handed fatty ester and cholesteryl chloride, a right-handed liquid crystal substance. The percentage composition of the two components of the mixture is plotted against $\lambda_0$ where $\lambda_0 = 2np$. It can be seen that at a particular composition, the left and right-handed components essentially compensate and the result is an infinite pitch. Moving away from this point the sense of any individual composition is determined by the dominant component. Defining the percent of cholesteryl chloride in the mixture as A, and that in the composition having infinite pitch as A*, it was found that when $A < A^*$ the films are left-handed and for $A > A^*$ the films are right-handed. It can be seen that it is possible to conveniently make liquid crystal compositions having any desired $\lambda_0$ value by resort to the technique shown.

The invention will now be further described with reference to specific preferred embodiments by way of examples to further aid those skilled in the art to practice the invention, it being understood that these are intended to be illustrative of the invention only and the invention is not limited to the conditions, materials or devices recited therein. All parts and percentages recited are by weight unless otherwise specified.

The behavior of the optical filters described in the examples is observed by measuring the transmission spectra of the filters using a Cary spectrometer. The reflection spectrum for each of the filters is inferred from its transmission spectrum since there is only negligible adsorption in each case.

Example I

A composition containing 85% of anisylidene-p-n-butylaniline (ABUTA) in cholesteryl oleyl carbonate (COC) is prepared. This composition has a $\lambda_0$ value of about 2.0 microns. A thin layer of the liquid crystalline mixture is placed on a Polaroid Sheet and subsequently another Polaroid Sheet is placed over the liquid crystal layer so that the axis of polarization of the two Polaroid Sheets have an angular relationship of about 90° to each other. This optical filter is then placed in the path of a light beam emitted from a broad band source of infrared radiation. The filter is positioned in a manner such that the incident radiation is normal to the filter. The optical filter substantially completely reflects all of the incident radiation with the exception of a wavelength band centered about a wavelength of about 2.0 microns which is transmitted.

Example II

Compositions containing 90% cholesteryl chloride (CC) in cholesteryl oleyl carbonate (COC) and 40% cholesteryl chloride (CC) in cholesteryl nonanoate (CN) are prepared. A thin layer of the composition of CC in COC is placed on a Polaroid Sheet and a thin glass plate is placed on the free surface of the liquid crystal layer. A thin layer of the composition of CC in CN is then applied to the free surface of the glass plate and subsequently a second Polaroid Sheet is placed over the free surface of the latter liquid crystal layer. The two Polaroid Sheets are arranged in a manner such that their respective axes of polarization has an angular relationship of about 90° to each other. This optical filter is then placed in the path of a light beam emitted from a broad band incandescent source of visible radiation. The filter is positioned so that the incident radiation is normal thereto. The filter substantially completely reflects all of the incident radiation with the exception of two wavelength bands centered about wavelengths of about 5000 A. and about 8000 A. which are transmitted.

Examples III–XXII

The procedure followed in Example I is followed using the stated liquid crystalline compositions.

Example III

10% CC in cholesteryl bromide (CB) having a $\lambda_0$ value of about 5900 A.

Example IV

30% cholesteryl formate (CF) in CN having a $\lambda_0$ value of about 4000 A.

Example V

20% cholesterol (CHOL) in CC having a $\lambda_0$ value of about 5.0 microns.

Example VI

72% CC in equal parts of cholesteryl propionate (CP) and cholesteryl decanoate (CD) having a $\lambda_0$ value of about 1.3 microns.

Example VII

76% of equal parts of CC and cholesterylbutyrate (C-BUT) in equal parts of CF and CD having a $\lambda_0$ value of about 1.7 microns.

Example VIII

91% CC in cholesteryl stearate (CS) having a $\lambda_0$ value of about 6300 A.

Example IX

74% CC in cholesteryl acetate (CA) having a $\lambda_0$ value of about 7700 A.

Example X

20% cholesteryl-2-(2 - butoxyethoxyl) ethylcarbonate (CBEC) in CC having a $\lambda_0$ value of about 6000 A.

Example XI

45% cholesteryl - 2 - (2-ethoxyethoxy) ethyl carbonate (CEEC) in CC having a $\lambda_0$ value of about 8000 A.

Example XII

50% CEEC in cholesteryl-n-propyl carbonate (NPC) having a $\lambda_0$ value of about 9000 A.

Example XIII

89% CC in cholesteryl caproate (C-CAP) having a $\lambda_0$ value of about 6200 A.

Example XIV

88% CC in cholesteryl caprylate (C-CYL) having a $\lambda_0$ value of about 6400 A.

Example XV

84% CC in cholesteryl valerate (CV) having a $\lambda_0$ value of about 7100 A.

Example XVI

86% CC in cholesteryl heptanoate (C-HEP) having a $\lambda_0$ value of about 7100 A.

Example XVII

90% CC in cholesteryl laurate (CL) having a $\lambda_0$ value of about 6600 A.

Example XVIII

85% CC in cholesteryl myristate (CM) having a $\lambda_0$ value of about 9600 A.

Example XIX

93% CC in cholesteryl palmitate (CP) having a $\lambda_0$ value of about 5900 A.

Example XX

20% CHOL in equal parts of CC and COC having a $\lambda_0$ value of about 9500 A.

Example XXI

80% CBEC in NPC having a $\lambda_0$ value of about 1.25 microns.

Example XXII

20% CHOL in COC having a $\lambda_0$ value of about 5500 A.

The invention has been described in detail with respect to various preferred embodiments thereof and further by way of specific preferred embodiments. It should be recognized however that the invention is not limited to the embodiments described but rather that various modifications can be made in the practice thereof. For example, the optical filter may be tilted with respect to the incident light beam so that the incident light is not normal to the filter. In this manner the $\lambda_0$ value of any liquid crystal films in the filter will be shifted. A detailed discussion relating to this procedure is given in copending U.S. patent application entitled "Tuning Method for Optical Devices" Ser. No. 104,368, filing date Jan. 6, 1971, and which is herein incorporated by reference.

While the invention has been described in detail with respect to certain embodiments thereof it is not intended to be limited thereto but rather it will be appreciated by those skilled in the art that modifications and variations are possible which are within the spirit of the invention and the scope of the claims.

What is claimed is:

1. An optical filter for providing transmission of incident radiation at desired wavelengths of the incident light comprising a linear polarizer member, a linear analyzer member, a plurality of liquid crystalline films having optically negative characteristics positioned between said linear polarizer and said linear analyzer, each of said liquid crystalline films having a different $\lambda_0$ value at the same temperature, where $\lambda_0$ is the center wavelength of the wavelength band of radiation reflected by each said liquid crystalline film, and means for separating said liquid crystalline films, said elements being arranged such that said optical filter is capable of transmitting more wavelength bands of radiation than a similar optical filter having one liquid crystalline film.

2. The optical filter as defined in claim 1 wherein the angular relationship of the axes of polarization of said linear polarizer and said linear analyzer is from about 80° to about 100°.

3. The optical filter as defined in claim 1 wherein the angular relationship of the axes of polarization of said linear polarizer and said linear analyzer is about 90°.

4. The optical filter as defined in claim 3 wherein three liquid crystal films are employed, each of said films having a $\lambda_0$ value in the visible region of the light spectrum.

5. The optical filter as defined in claim 1 wherein each of said liquid crystalline films comprises a substance chosen from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crytalline substances which are compatible with the cholesteric liquid crystalline substances; and mixtures thereof.

6. The optical filter as defined in claim 1 wherein each of said liquid crystalline films is from about 0.5 to about 20 microns in thickness.

7. The optical filter as defined in claim 4 wherein each of said liquid crystalline films is from about 3 to about 10 microns in thickness.

8. A method for transmitting desired wavelengths of incident radiation while substantially completely rejecting all other wavelengths of the incident radiation comprising:
    (a) providing a source of light
    (b) providing an optical filter comprising a linear polarizer member, a linear analyzer member, a plurality of separate liquid crystal films having optically negative characteristics positioned between said linear polarizer and said linear analyzer, each said liquid crystal film having a different $\lambda_0$ value at the operational temperature, where $\lambda_0$ is the center wavelength of the wavelength band of radiation reflected by each said liquid crystal film, and means for separating said liquid crystal films; and
    (c) directing an incident beam of radiation from said light source upon said optical filter thereby providing an emergent light beam containing a wavelength band centered about some wavelength $\lambda_0$ for each said liquid crystal film whereby said optical filter is capable of transmitting more wavelength bands of radiation than a similar optical filter having one liquid crystal film.

9. The method as defined in claim 8 wherein the angular relationship of the axes of polarization of said linear analyzer and said linear polarizer is from about 80° to about 100°.

10. The method as defined in claim 8 wherein the angular relationship of the axes of polarization of said linear polarizer and said linear analyzer is about 90°.

11. The method as defined in claim 10 wherein said optical filter has three liquid crystal films arranged between said linear polarizer and said linear analyzer, each of said films having a $\lambda_0$ value in the visible spectrum.

12. The method as defined in claim 8 wherein said incident beam of radiation is directed upon said optical filter at normal incidence.

13. The method as defined in claim 8 wherein each said liquid crystal film comprises a substance chosen from the group consisting of: cholesteric liquid crystalline substances; mixtures of cholesteric liquid crystalline substances and nematic liquid crystalline substances; mixtures of cholesteric liquid crystalline substances and smetic liquid crystalline substances; mixtures of cholesteric liquid crystalline substances and non-liquid crystalline substances which are compatible with the cholesteric liquid crystalline substances; and mixtures thereof.

14. The method as defined in claim 8 wherein each of said liquid crystal film is from about 0.5 to about 20 microns in thickness.

15. The method as defined in claim 11 wherein each said liquid crystal film is from about 3 to about 10 microns in thickness.

References Cited

UNITED STATES PATENTS 3,114,836  12/1963  Fergason _____ 350—160 LC

FOREIGN PATENTS 1,120,093  7/1968  Great Britain ____ 350—160 LC

OTHER REFERENCES

Fergason: Molecular Crystals, vol. 1, No. 2, April 1966, pp. 293–307.

DAVID SCHONBERG, Primary Examiner

R. J. STERN, Assistant Examiner

U.S. Cl. X.R.

23—230 LC; 350—160 LC